United States Patent [19]
Al-Hamlan

[11] Patent Number: 5,176,163
[45] Date of Patent: Jan. 5, 1993

[54] FLOW-CONTROLLED IRRIGATION SYSTEM

[76] Inventor: Saleh A. Al-Hamlan, P.O. Box 12872 St. Ibrahim Islam, Jeddah, Saudi Arabia 21483

[21] Appl. No.: 804,922

[22] Filed: Dec. 11, 1991

[51] Int. Cl.$^5$ ............................................. A01G 27/00
[52] U.S. Cl. ................................ 137/119; 137/624.27; 222/20
[58] Field of Search ............... 137/119, 624.27, 625.48, 137/872, 624.14; 239/66, 68; 222/20

[56] References Cited

U.S. PATENT DOCUMENTS

| | | | |
|---|---|---|---|
| 451,129 | 4/1891 | Miller | 222/20 X |
| 958,664 | 5/1910 | Moore | 222/20 |
| 1,043,296 | 11/1912 | Burton | 222/20 |
| 1,446,174 | 2/1923 | Goldman | 137/872 X |
| 1,812,586 | 6/1931 | Elder | 239/68 X |
| 2,812,107 | 11/1957 | De Young | 222/20 |
| 3,068,901 | 12/1962 | Anderson | 137/872 X |
| 4,214,602 | 7/1980 | Pradillon | 137/624.27 X |
| 4,423,741 | 1/1984 | Levy | 137/625.48 X |

*Primary Examiner*—Alan Cohan
*Attorney, Agent, or Firm*—Bacon & Thomas

[57] ABSTRACT

A flow controlled irrigation system which automatically stops the flow of water to an area when that area has received a predetermined quantity of water and then redirects the water to another area is disclosed. The system includes an upwardly extending gate member which defines a pair of passages therein. A first of the passages directs water to an area to be irrigated while the second causes the water flow to bypass the area. A flow control member activates the gate member when a predetermined volume of water has flowed through a meter.

8 Claims, 13 Drawing Sheets

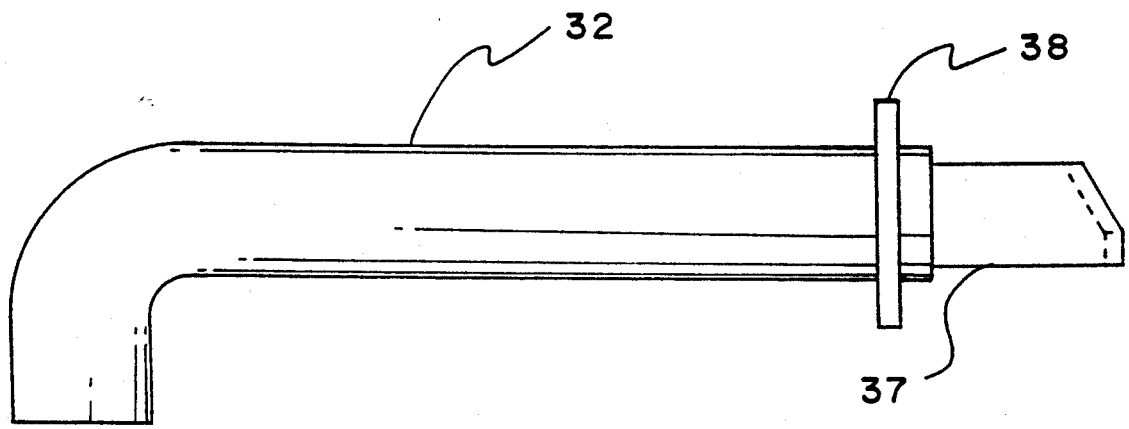
FIG. 9a
FIG. 9b
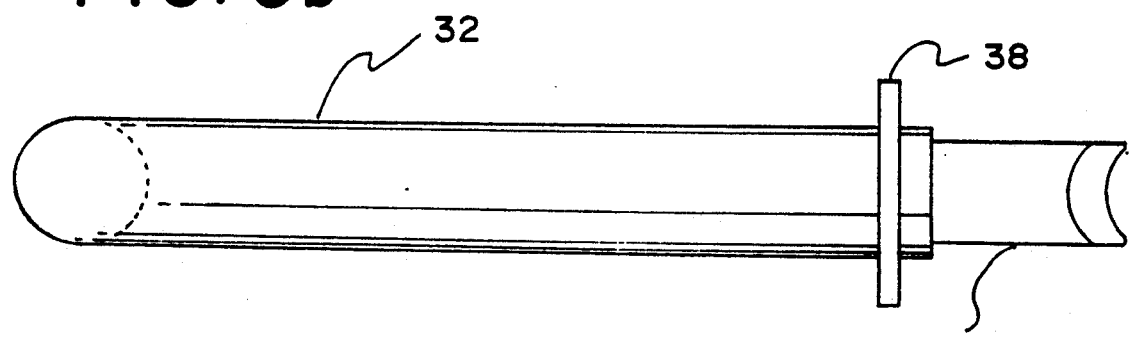
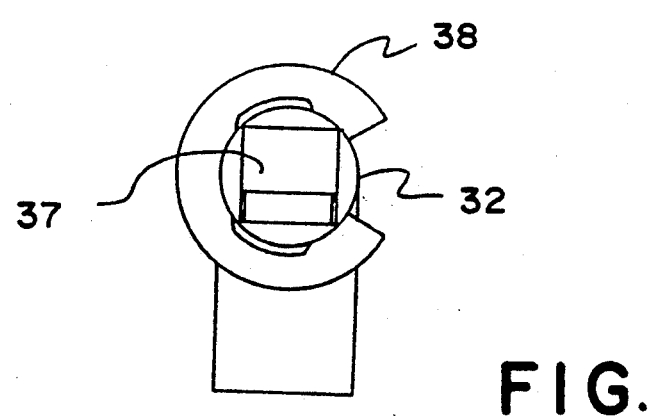
FIG. 9c

FLOW-CONTROLLED IRRIGATION SYSTEM

BACKGROUND OF THE INVENTION

This invention relates to an irrigation system for sequentially irrigating a plurality of areas and, more particularly, to a flow-controlled irrigation system which automatically stops the flow of water to an area when that area has received a predetermined quantity of water and then redirects the flow of water to another area.

Irrigation systems have been used for many years to provide plants and trees with water at various times during their growing cycle. For example, it has been common practice to provide plants and trees with water by means of irrigation ditches, hoses, sprayers, pipes and other types of apparatus. However, in certain situations, such as in orchards where the terrain is uneven, water will run from the high ground to the low. In such cases, the low lying trees may receive more water than those on higher ground.

In other cases, where the cost of water is relatively high it is desirable to control the amount of water provided for each area and to avoid wasting water by providing additional water to some plants in order to adequately water others or by leaving the water on for too long a period.

The above problems have been overcome to a degree by irrigation systems having a plurality of valves with each valve connected by means of pipes to a pressurized source of water. For example, the Rodieck U.S. Pat. Nos. 3,797,253 and 4,014,361, disclose systems wherein each item to be watered is provided with a well around its base and a separate valve within each of the wells. In such systems, one or more risers may be provided in order to force each valve that has been closed by the water reaching a preselected height in the well to remain closed for as long as there is water pressure applied to the system. Such systems also include means to prevent the flow of water to a second valve until such time that a first area has been provided with a predetermined volume of water.

A more recent development is disclosed in my copending application entitled "Irrigation System," Ser. No. 07/457,870, which was filed on Dec. 27, 1989, and which is incorporated herein in its entirety by reference. As disclosed therein, an irrigation system includes one or more valve assemblies which are connected in series to a pressurized source of water. Each valve assembly includes a cylindrical housing, a ball valve, an inlet and two outlets with one outlet generally opposite from the inlet in a lower portion of the housing. The other outlet is disposed in an upper portion of the housing and is adapted to direct water to an area of ground for irrigation. A pit and a float are associated with each valve assembly and arranged so that some of the irrigation water will flow into the pit and raise the float. The float is connected to spring biasing means and when the float reaches a predetermined level, the ball valve will spring upwardly to close the upper outlet and redirect the water to another assembly. Water pressure will then maintain the valve in that position.

A further development or improved system of the aforementioned type is disclosed in my copending patent application, U.S. Ser. No. 07/788,282. That application was filed on Nov. 5, 1991, entitled "Improved Irrigation System" and is incorporated herein in its entirety by reference. In that system, the amount of water to be delivered to a given area is independent of any changes in water pressure. For example, an irrigation system in accordance with that invention includes means for storing a force, such as a compressed spring, which is sufficient to overcome a force against the ball-shaped gate member due to the flow of water. Therefore, when the float reaches a preselected height, the force in the spring is released to thereby direct the flow of water through the second outlet. In such systems, the opening of one outlet and closure of a second is solely dependent on the position of the float, i.e., the water level within a pit.

It has now been found that an improvement on the aforementioned system allows an individual to preselect a quantity of water to be supplied to a given area and to activate the mechanism automatically when that quantity of water passes through a valve.

SUMMARY OF THE INVENTION

In essence, an irrigation system according to the present invention is designed for use with a pressurized source of water. The system includes a hollow valve housing having an upwardly extending hollow cylindrical portion with a first annular opening or outlet in an upper portion thereof. The housing also includes second and third annular openings in a lower portion thereof with the second and third portions being preferably, but not necessarily, axially aligned. An upwardly extending gate member is disposed within the hollow cylindrical portion of the housing and is constructed and arranged to sealingly engage the walls of the hollow cylindrical portion and move upwardly and downwardly therein. The gate member defines a first passageway which connects the inlet and the first annular outlet when the gate member is in a first position so that water will flow from the inlet through the passageway and out of the first outlet. The gate member also defines a second passageway in a lower portion thereof which is constructed and arranged so that it connects the inlet with the second outlet when the gate member is in a second position, i.e., a bypass position. An upwardly extending passageway or pipe is connected to the first annular outlet and means such as a distribution pipe are provided for directing a flow of water outwardly from the upwardly extending pipe to a first area for irrigation. Flow control means and means such as a flow meter, which is responsive to a predetermined volume of water passing through the meter, activate the flow control means for moving the gate member from its first position wherein the water flows through the system and outwardly for irrigation to its second position so that water bypasses the first area and flows to another valve.

The irrigation system described herein is presently believed to be particularly applicable for those areas wherein drip irrigation or sprinkler system are used. Such systems also allow an individual to readily select a given quantity of water to be applied to a given area, to bypass selected areas, if desired, and are relatively insensitive to changes in water pressure. In addition, the systems are relatively inexpensive to manufacture, easy to use and maintain and reliable in operation.

For comparison, the system according to my earlier invention did not incorporate means which are responsive to the quantity of water flowing through the system to automatically redirect the flow of water to another area when a preselected amount or quantity of water has been provided.

The invention will now be described in connection with the following drawings in which like numerals have been used to identify like parts.

BRIEF DESCRIPTION OF THE DRAWINGS

FIGS. 9a, 9b and 9c illustrate portions of the flow control means;

DETAILED DESCRIPTION OF THE PREFERRED EMBODIMENT OF THE INVENTION

Figure 1:
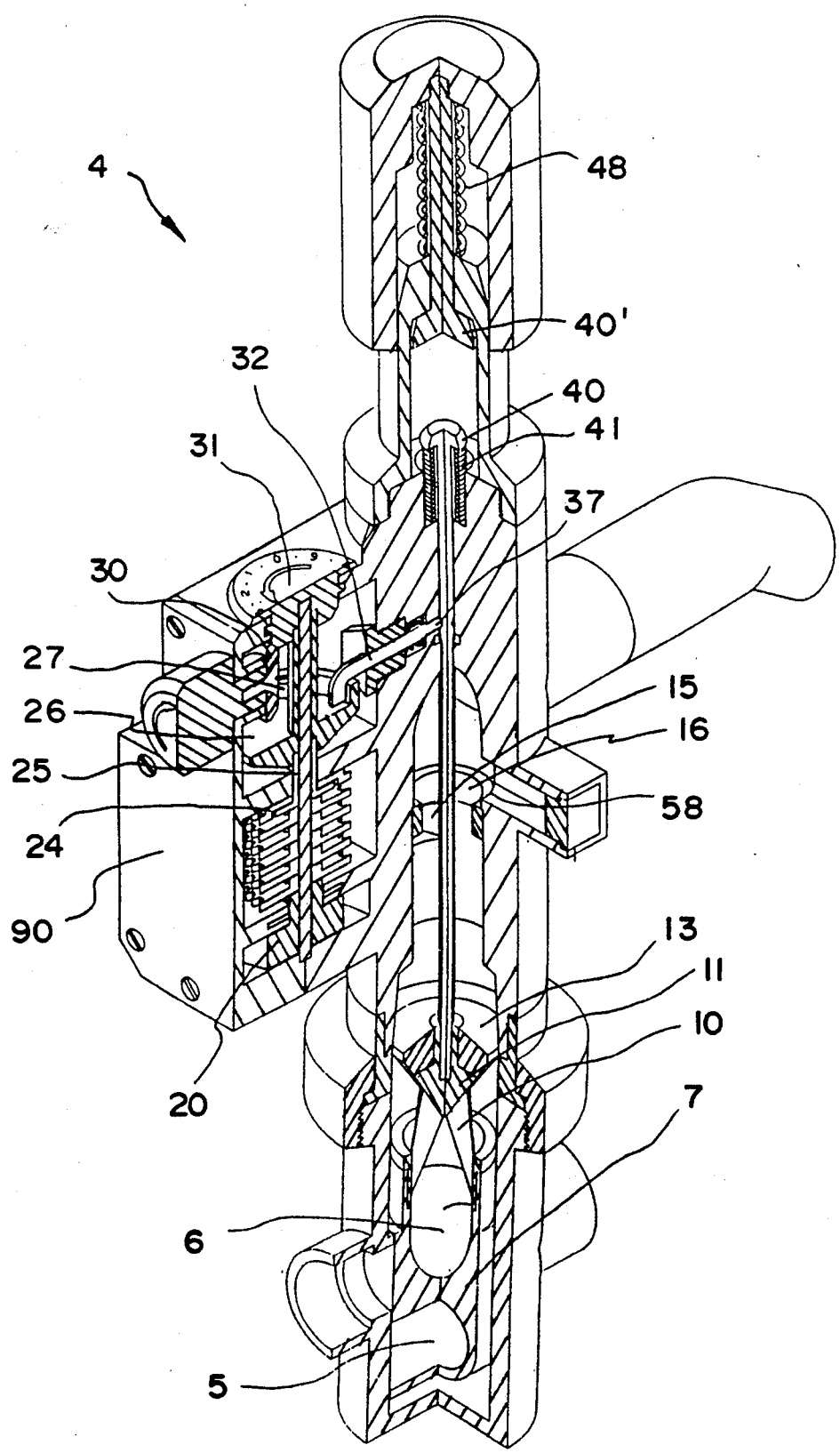
FIG. 1 is an isometric view which is partially broken away to illustrate the operable parts of an irrigation system according to a first embodiment of the invention.
Figure 2:
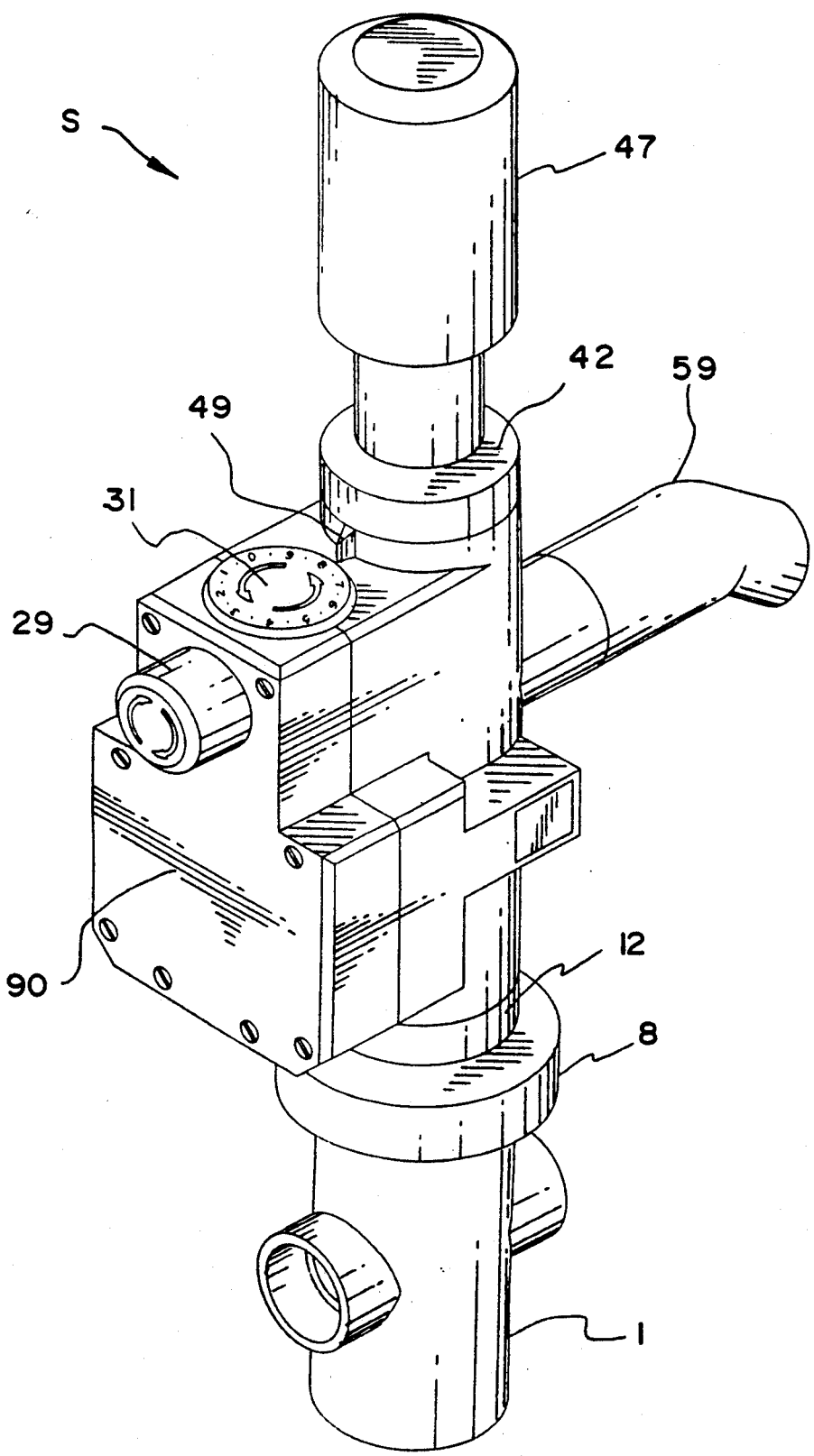
FIG. 2 is an isometric view which illustrates the outside of the first embodiment of the invention.

An irrigation system, according to a presently preferred embodiment of the invention, includes one or more valve assemblies as illustrated in FIGS. 1 through 9. Each of the assemblies may be considered to be an irrigation system per se, but are normally connected together in series for irrigating a plurality of areas as explained more fully in my aforementioned pending application.

In practice, a plurality of valve assemblies or irrigation systems are connected in a series by a pipeline and are constructed and arranged so that water will flow to a first assembly and be diverted thereby through the valve and outwardly therefrom in order to irrigate an area adjacent the system. When a preselected quantity of water has been provided to the first area, the first assembly will automatically direct the flow of water through the valve and on to a second assembly.

The system or valve assembly will now be described with references to the figures and in connection with its operation.

Each assembly or system 4 includes a hollow valve housing 1 which includes a hollow cylindrical portion 160. The hollow cylindrical portion 160 extends upwardly, preferably along a vertical axis, and defines a first annular opening 162 in an upper portion thereof.

The housing 1 also defines second and third annular openings inlet 164 and outlet 166 which are preferably axially aligned. An upwardly extending gate member 7 is disposed within the hollow cylindrical portion 160 and is sealing engaged with the inner walls of the portion 160. The gate member 7 is also constructed and arranged for vertical movement upwardly and downwardly within portion 160.

The gate member 7 defines a first passageway 6 in an upper portion thereof which has an annular cross-section, is constructed and arranged with a 90° turn or change in direction for connecting inlet 164 and first annular opening 162 when the gate member 7 is in a first or lower position. The member 7 also defines a second passageway 5 in a lower position thereof for connecting the inlet 164 with the outlet 166 when the gate member 7 is in a second or upper position. The cross-sections of passageways 5 and 6 are preferably equal to the cross-section of inlet 164 and outlet 166 so that water will flow through the passageway with little or no obstruction.

An upwardly extending member or pipe 14 is connected to annular outlet 162 in a conventional manner such as by a coupling 12 and ring 8. The upwardly extending pipe 14 also includes an upper extension 17. Extension 17 also includes an inner passage that undergoes a 90° change in direction to direct a flow of water to a spout or outlet pipe 59.

A rod 39 is connected to gate member 7 by means of a wing-like element 10 and element 9 and extends upwardly through the upwardly extending pipe 14. The rod 39 is preferably vertically disposed and has a coil spring 41 is disposed on an upper end of thereof. The coil spring 41 is retained on rod 39 by a cap 40. The lower portion of spring 41 rests on a shoulder 168 within an upper portion 17 of the member or pipe 14. The spring 41 biases the rod upwardly to thereby raise gate member 7 into its upper position except when spring 41 is compressed into a force-stored condition with gate member 7 in its lower position.

The irrigation system also includes a flow-regulating assembly which measures the quantity of water passing through the system and outwardly therefrom for irrigation of a given area. The flow-regulating assembly and other details of the system will be described in connection with the operation of the system.

In operation, an individual or farmer determines the quantity of water to be delivered to a given area and selects that quantity by turning knob 29 until an indicator 31 is rotated to a position opposite marker 49 that corresponds to the quantity of water which is desired. For example, when knob 29 is turned, beveled gears 30 and 28 are also rotated. The indicator 31 and gear 28 are also fixed to a rotatable shaft 25 which passes through a series of gears or gear train and through a disc-shaped activator 26 in a manner which will be described hereinafter.

After selecting the appropriate number on indicator 31, the individual presses downwardly on the cylindrically-shaped cap member 47 to thereby compress spring 48 which rests on a flat portion 43 or the top of upper housing 42 and force push rod 45 having an operable end 40' downwardly and into engagement with cap 39a. Further depression forces rod 39 downwardly. Since rod 39 is connected to gate member 7 by means of a cone-shaped member 11, element 9 and wing-like element 10, gate member 7 is moved downwardly until it hits a detent or stop with passageway 6 in alignment with inlet 164. Passageway 6 will then direct the flow of water upwardly into and through pipe 14. At this point, activator 37 of the stop means or rod 37, will engage a detent or circular hollow in rod 39 to prevent the rod 39 from moving upwardly in response to the stored force in spring 41.

Figure 3:
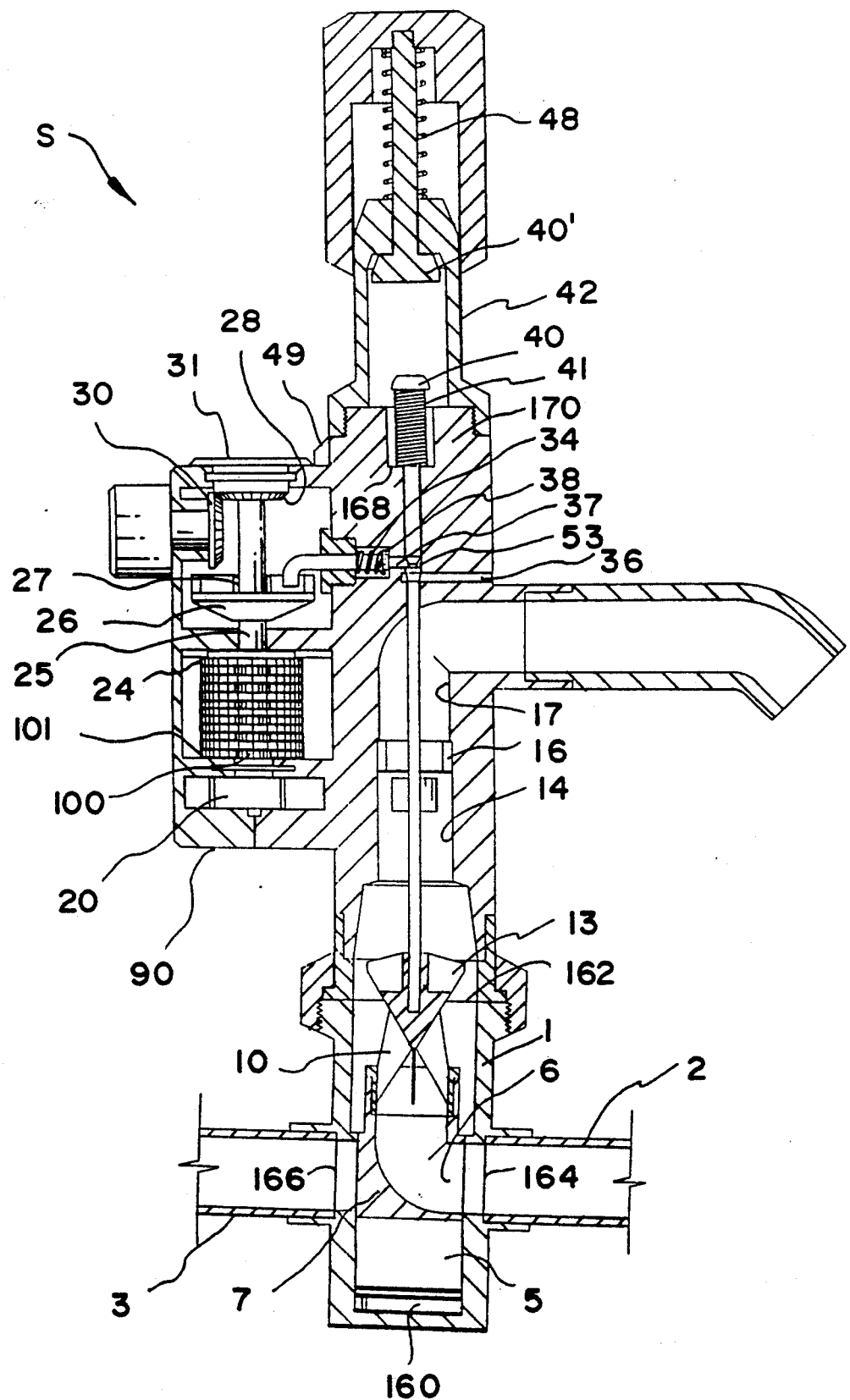
FIG. 3 is a cross-sectional view of the system shown in FIGS. 1 and 2.
Figure 4:
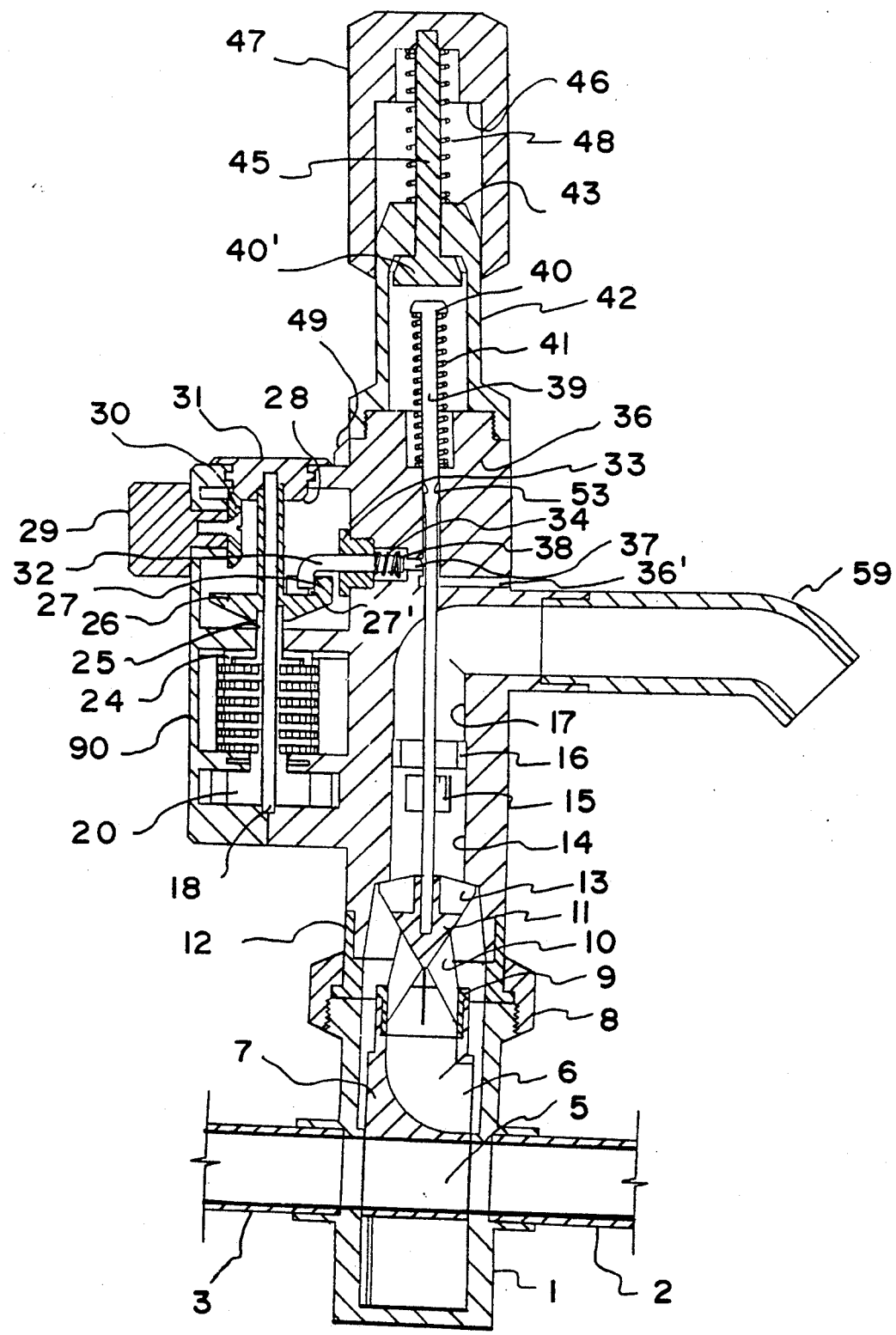
FIG. 4 is a cross-sectional view of the system shown in FIGS. 1 through 3, but with the valve assembly in a second or flow-through position.
Figure 5:
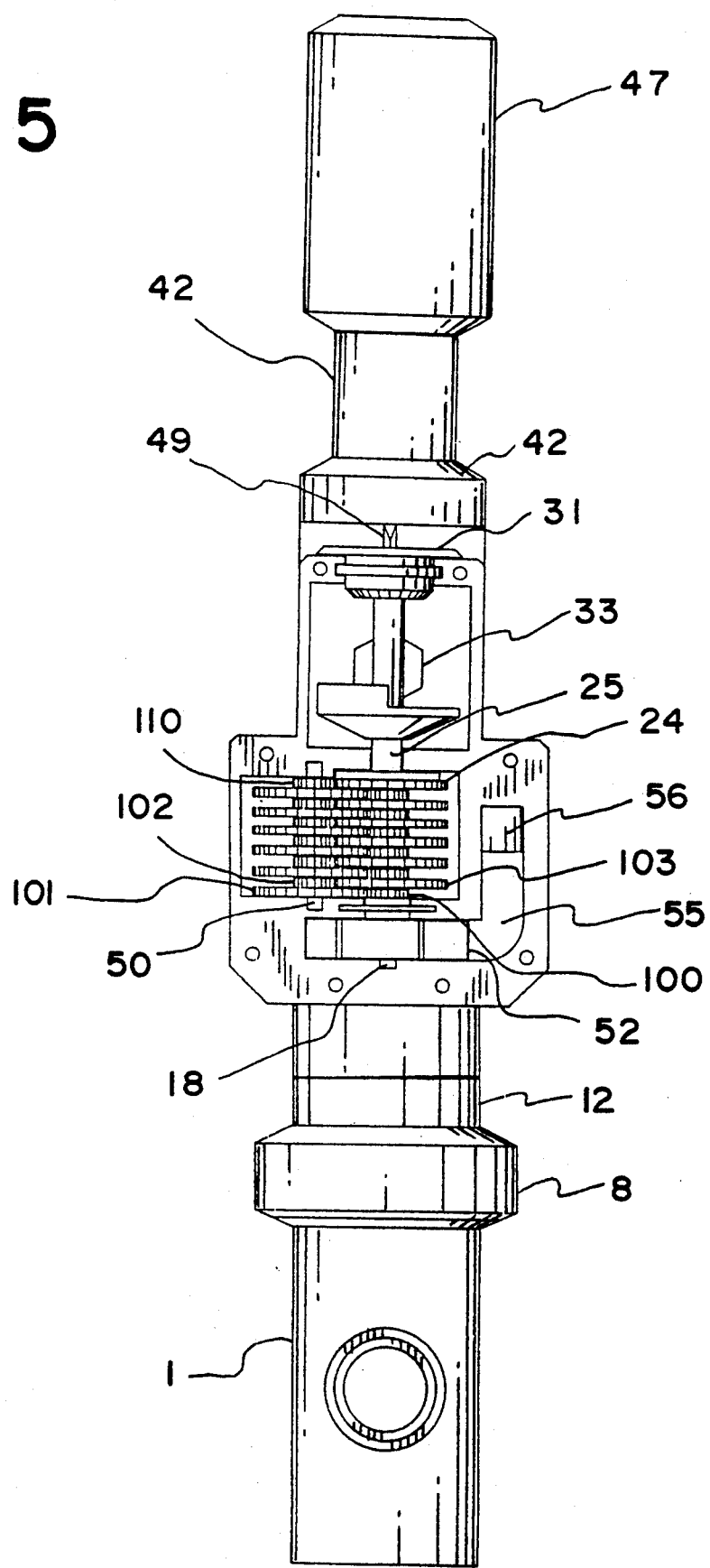
FIG. 5 is a rear-elevational view of the system shown in FIGS. 1 through 4, but with the cover over a flow measuring subsystem removed.
Figure 6:
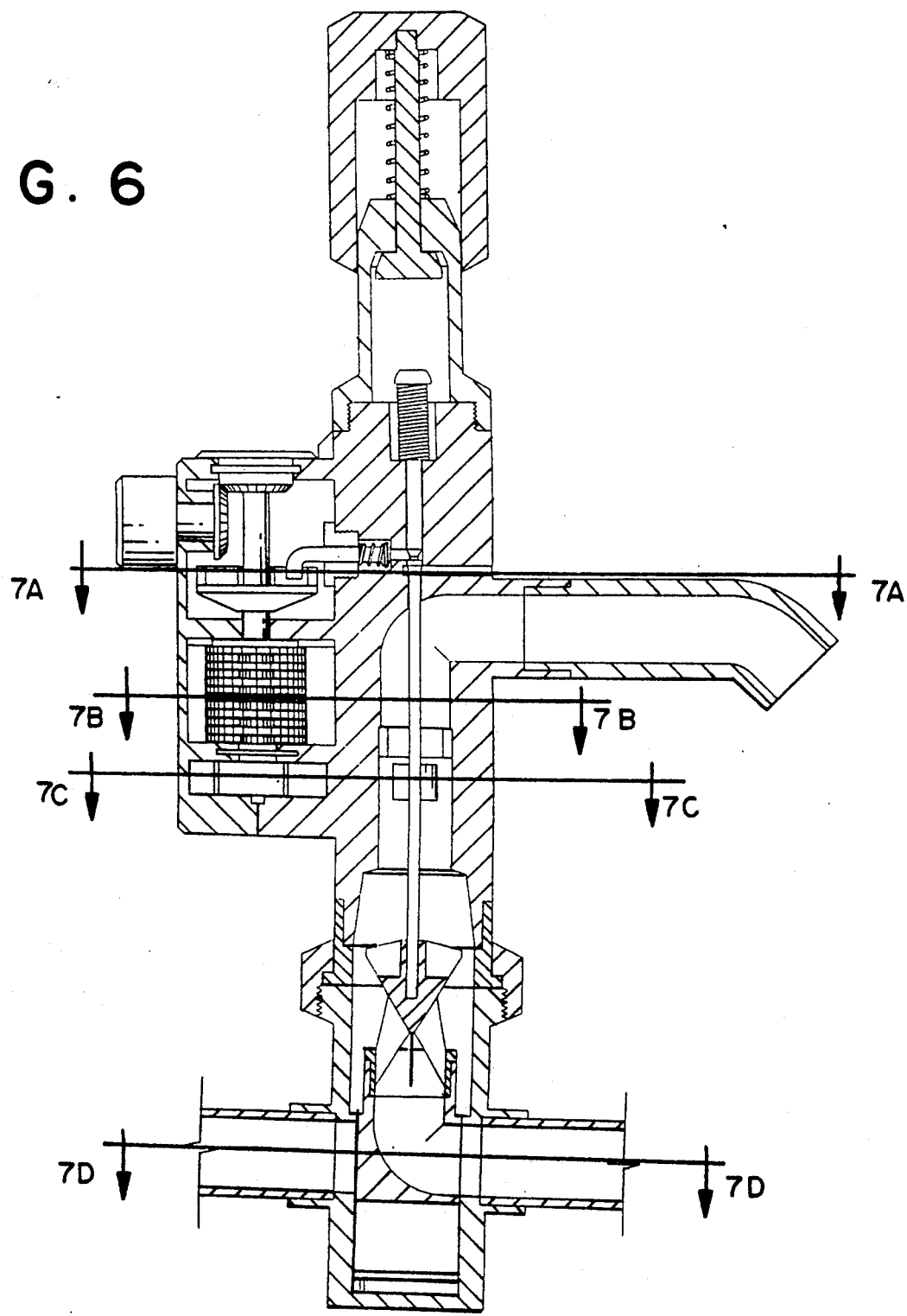
FIG. 6 is a cross-sectional view of the system shown in FIG. 4, but with the valve assembly in a first position wherein water flows through the system.

In designing an irrigation system in accordance with the present invention, it is desirable to provide a stop or upper housing 42 for engaging the bottom of cap member 47 so that the bottom of gate member 7 does not strike or engage the bottom of valve housing 1, i.e., the bottom of the hollow cylindrical portion 160 as illustrated more clearly in FIG. 3. It is also desirable to manufacture upper housing 42 of a transparent material so that an individual can readily determine the position of rod 39.

Figure 7A:
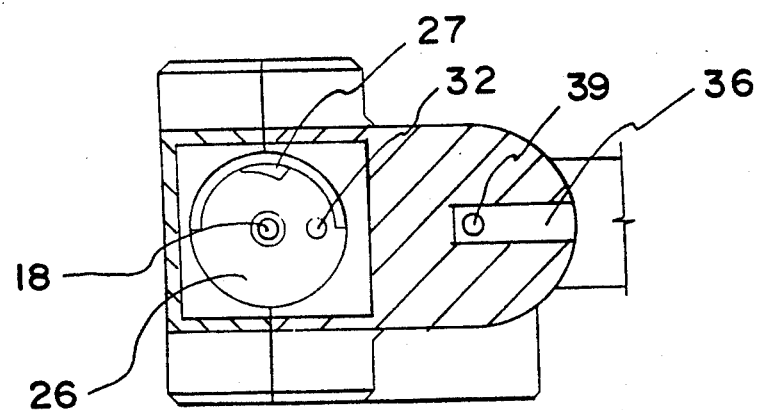
FIGS. 7a, 7b, 7c and 7d are cross-sectional views taken along lines a—a, b—b, c—c and d—d of FIG. 6.
Figure 7B:
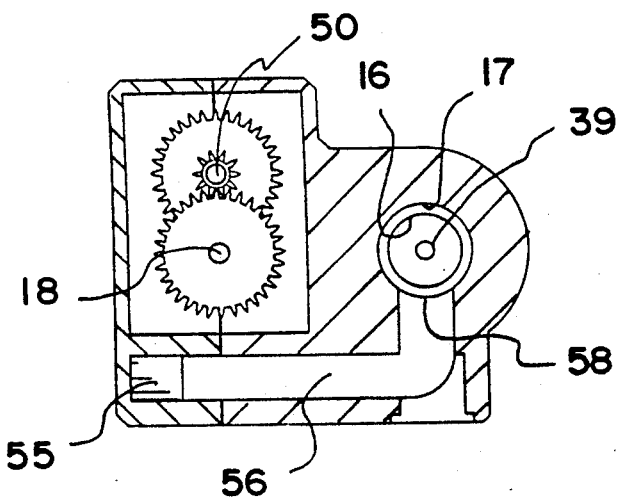
Figure 7C:
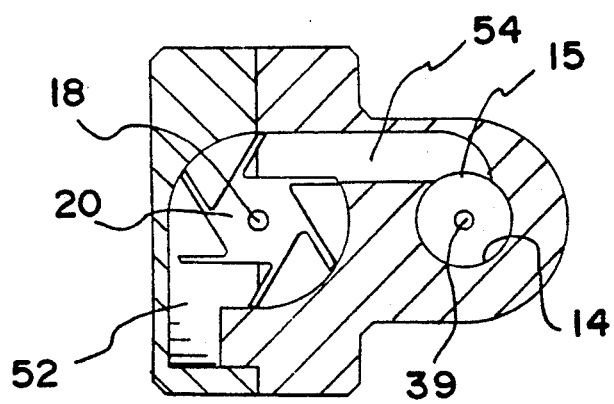
Figure 7D:
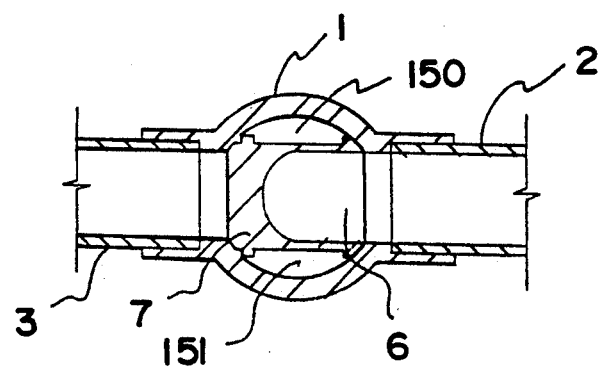

As shown more clearly in FIG. 7d, the gate member 7 defines a pair of recesses 150 and 151. The recesses 150 and 151 allow any water which accumulates in the bottom of the housing 1 below the gate member 7 to be forced upwardly through the recesses 150 and 151 when the gate member 7 is moved downwardly into its lower position.

After setting the gate member 7 in its first or lower position, a main valve (not shown) is opened so that water flows through pipe 2, inlet 164 and passageway 6. Passageway 6 then directs the water vertically and upwardly as the result of the 90° bend in the passageway 6. The water will then flow over or past the wing-shaped element 10 and generally cone-shaped member 11.

The rising column of water strikes the cylindrically-shaped piece or restrictor 16 which provides a reduction in cross-section so that a measurable quantity of water will enter a passage 54 through an opening 15. The sum of the cross-sectional areas of restrictor 16 and passage 54 are equal to the cross-sectional area of pipe 17. The water flowing through passage 54 rotates fan 20. The cross-sectioned area of the passage 54 is equal to the area of opening 15 and since element 16 restricts the flow of water into portion 17, water is forced into and through passage 54.

As water flows through the opening 15 and passage 54, it causes fan 20 to rotate and continues to flow through an opening 52, and passage 55 to passage 56. From passage 56, the water flows out into pipe 17 by means of an opening 58 where it meets or joins with the water flowing through the cylindrically-shaped piece or restrictor 16.

The water which flows through opening 58, together with the water which flows through cylindrically-shaped piece 16, will then flow into and out of pipe 59 to irrigate a given area. If drip irrigation or sprinklers are to be used, the drip irrigation pipe (not shown) or sprinkler (not shown) are connected to pipe 59.

Valve Activating Mechanism

The mechanism for activating the valve includes fan 20 which is constructed and arranged to rotate counter clockwise in response to the flow of water through passages 55 and 56. A shaft 18 extends upwardly through fan 20 and upwardly through a gear train and through element 25 and activator 26. The gear train includes a second shaft 50 and a plurality of large and small diameter gears in an arrangement which will be well understood by those skilled in the art of manufacturing water meters. For example, for each 100 rotations of fan 20, there may be one rotation of a relatively large diameter gear 101 and for each 10 revolutions of gear 101, there would be a single revolution of the relatively small gear 100 and so forth until gear 24 rotates element 25 and activator 26. In one embodiment of the invention, one million revolutions of fan 20 will translate into one rotation of element 25 and activator 26. Access to this mechanism is provided by removing cover 90.

Figure 8A:
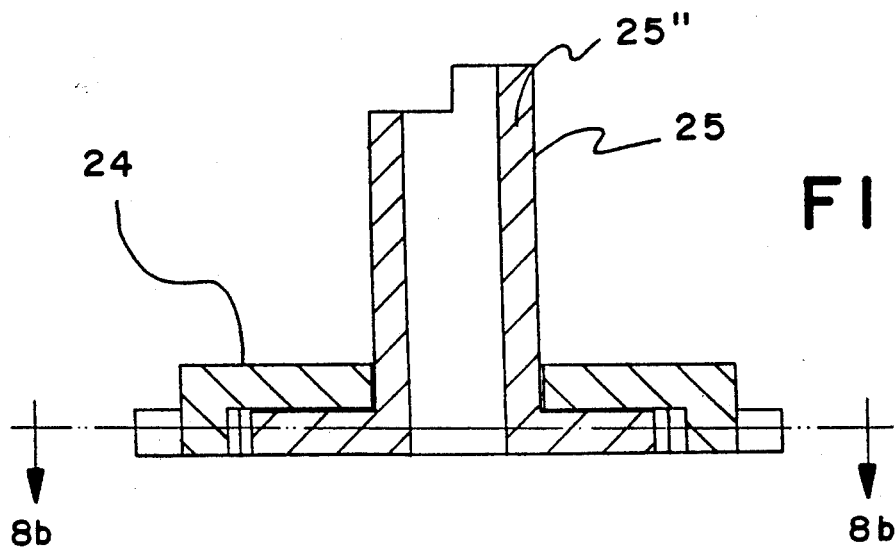
FIGS. 8a and 8b are cross-sectional view of a portion of the flow measuring system.
Figure 8B:
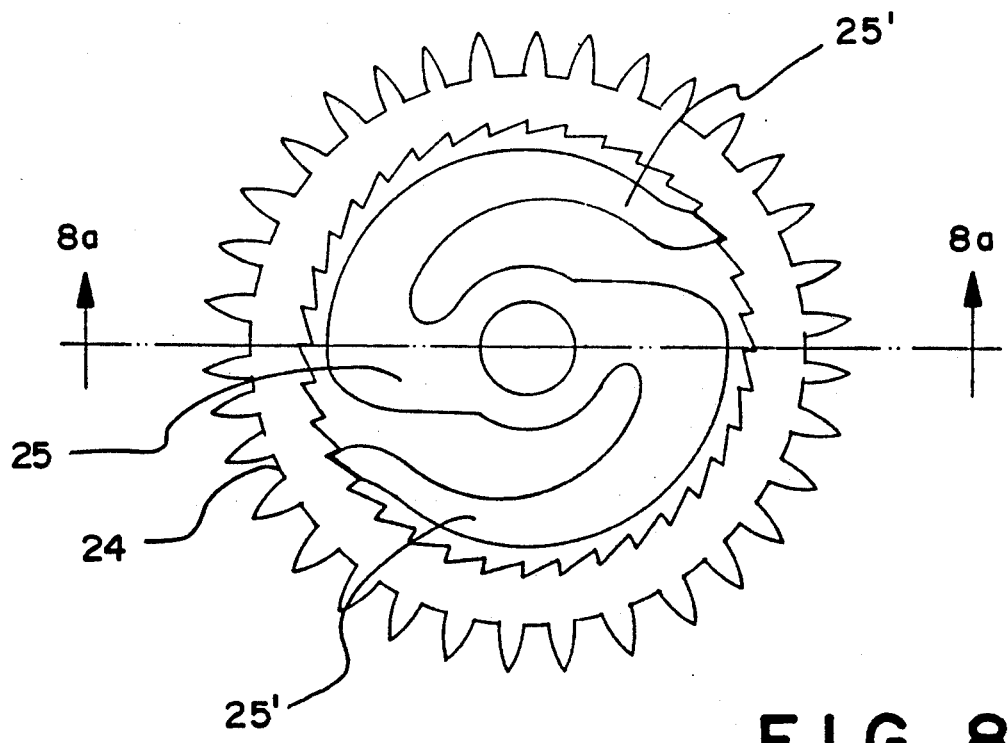

Element 25 is illustrated more fully in FIGS. 8a and 8b. As illustrated therein, element 25 has a upwardly extending cylindrically-shaped portion and includes a pair of arms in the form of an S-shaped stop means or portion 25'. The ends of portion 25' engage an internal detent portion or teeth of gear 24 to prevent clockwise rotation of element 25. At the same time, the S-shaped portion 25' engages gear 24 to cause element 25 to rotate counter-clockwise in response to the rotation of gear 24.

The activator 26 is disposed immediately above element 25 and is rotatably mounted on shaft 18 for rotation in response to the rotation of element 25. The activator 26 defines a dish-like cylindrical shape with an outer wall 27 along about one-half of its perimeter. The wall 27 includes an inclined projection or cam surface 27'. As the activator 26 is rotated, the inclined projection engages stop member 32. The stop member 32 is shown more clearly in FIGS. 9a through 9c. As shown in FIG. 9a, the member 32 includes an L-shaped rod having a ring 38 fixed at one end thereof and a projection 37 extending outwardly beyond the ring 38. Thus, when the cam surface 27' engages the L-shaped portion of stop member 32, it forces stop member 32 outwardly away from the rod 39. As shown, the stop member 32 is normally biased toward rod 39 by means of a spring 34 which engages the ring 38 and a retainer 33 which maintains the spring 34 in place.

For clarification, activator 26 is illustrated in FIG. 7a. As shown therein, the activator 26 defines a circular or disc-shape and includes an upwardly extending wall 27 about a portion of its perimeter. As illustrated, the wall 27 extends around about one-half of the perimeter of activator 26. The wall 27 also includes an inwardly protruding projection or cam surface 27'. This cam surface 27' engages the inner portion, i.e., the bottom of the L-shaped stop member 32.

Element 25 also includes an upwardly extending cylindrical portion 25" which extends upwardly along shaft 18 and engages indicator 31.

In the preferred embodiment of the invention, the distance between shaft 50 and the shaft 18 is equal to the sum of one-half the diameter of one of the larger diameter gears 101 and one-half the diameter of one of the relatively small diameter gears 100. The lower relatively large diameter gear 101 on the shaft 50 meshes with the relatively small diameter gear 100. Gear 100 is then connected to the fan 20 which turns as a result of water flowing through the passages 55 and 56. As fan 20 turns, it will rotate gear 101 on the shaft 50. Gear 102, which is also mounted on shaft 50 on top of gear 101, will be rotated thereby in the same direction. Gear 102, which engages a relatively large diameter gear 103, turns gear 103 in the opposite direction. This operation is then repeated from gear to gear until the motion, i.e., the rotation with reduction has progressed through the gear train. When the upper gear 110 on shaft 50 rotates, it will in turn rotate gear 24 on shaft 18. FIG. 7c shows the positioning of fan 20 and shaft 18 as well as opening 52, passage 54 and opening 15 as well as their positioning with respect to pipe 14 and rod 39.

The two ends of arms 25' are disposed within a central opening defined by gear 24; therefore, these ends will engage two teeth on the inside of the gear 24. Therefore, as the element 25 starts rotating in the direction of the gear 24, piece 26 will also start rotating in the same direction as element 25. Element 26 will keep on rotating until the inclined surface 27' engages the L-shaped portion of the stop member 32. Element 26 will then continue to rotate until the projection 27' draws the stop member 32 outwardly in a direction which is away from rod 39. This movement of member 32 moves projection 37 outwardly from engagement with a detent 53 in the rod 39. Then, as a result of the stored energy in the spring 41, the rod 39 moves up, drawing the gate member 7 upwardly by means of the cone-shaped element 11 and the wings 10. On the top of the cone 11, there is an elastic part 13 which defines a circular shape. A gate member 7 then moves upwardly until the elastic part 13 meets in sealing engagement with the bottom of the pipe 14. Elastic part 13 then prevents any water leakage from the lower portion of housing 1 as a result of space between the gate member 7 and the surrounding housing which is adjacent to the gate member 7. After the gate member 7 is moved upwardly, the passage 6 is moved out of alignment with the pipe 2 and is replaced by the horizontal passage 5 which will then redirect the flow of water from the pipe 2 to the pipe 3 and to the next apparatus.

A horizontal passage 36' is provided in an upper assembly 36 above the horizontal pipe 59. This passage 36' allows any water which flows upwardly along rod 39 to flow out of the system.

Calculating the Quantity of Water

The quantity of water which flows through the system may be determined by rotating knob 29 acting in connection with indicator 31 by marker 49. For example, knob 29, acting in connection with indicator 31, positions activator 26 so that a full or a partial rotation thereof will move stop mechanism 32 outwardly away from rod 39 to thereby release the energy stored in spring 41 and stop the flow of water into pipe 14.

The activator 26 is connected with the mechanical gear train that turns it in response to the flow of water. This gear train includes a plurality of gears on shafts 18 and 50 as previously described. The gear train and positioning of shafts 18 and 50 are shown in FIG. 7b. That figure also shows the positioning of passages 55 and 56 as well as the arrangement of pipe 17 and rod 39. The purpose of the gear train is to transmit the rotation of the fan 20 with substantial reduction to the activator 26. For example, when the fan 20 rotates perhaps one million times, the activator will rotate only one time. This reduction, of course, depends on the number of gears and their diameters as will be well understood by those skilled in the art of manufacturing and designing water meters and other flow-responsive instruments. Taking as an example that one turn of fan 20 represent one cubic centimeter of water flowing through the passage 54, this means that when the activator 26 rotates one complete cycle, it indicates that the quantity of water flowing through passage 54 equals one million cubic centimeters, i.e., 1 cubic meter.

Assuming that the cross-sectional area of cylindrical piece or restrictor 16 is three times the cross-sectional area of passage 54, the amount of water flowing through the restrictor 16 is three times the quantity of water flowing through passage 54. The sum of the two would then be four cubic meters which would pass through the horizontal pipe 59. This means that for a full rotation of the activator 26, four cubic meters of water will be applied to a given area and then the water will be cut off from that area and the water flow will be automatically redirected to the next apparatus.

To facilitate the selection of the quantity of water, the indicator 31 is divided into numbers 0 to 9, so that each number means a quantity of water which will flow as a result of one of that number is equal to one tenth (1/10) of the water which would flow as the result of one full revolution of activator 26. Accordingly, in the previous example where the quantity of water was four cubic meters, each number on the indicator 31 would mean that a quantity of water equal to 400 liters would flow. In other words, when the indicator 31 is set by means of the knob 29 so that the number 1 is in front of the marker 49, this will mean that the water flow through the apparatus equals 400 liters and that the water flow will stop after that amount of water has been provided. Selecting the number 4 would result in 1,600 liters.

Figure 10:
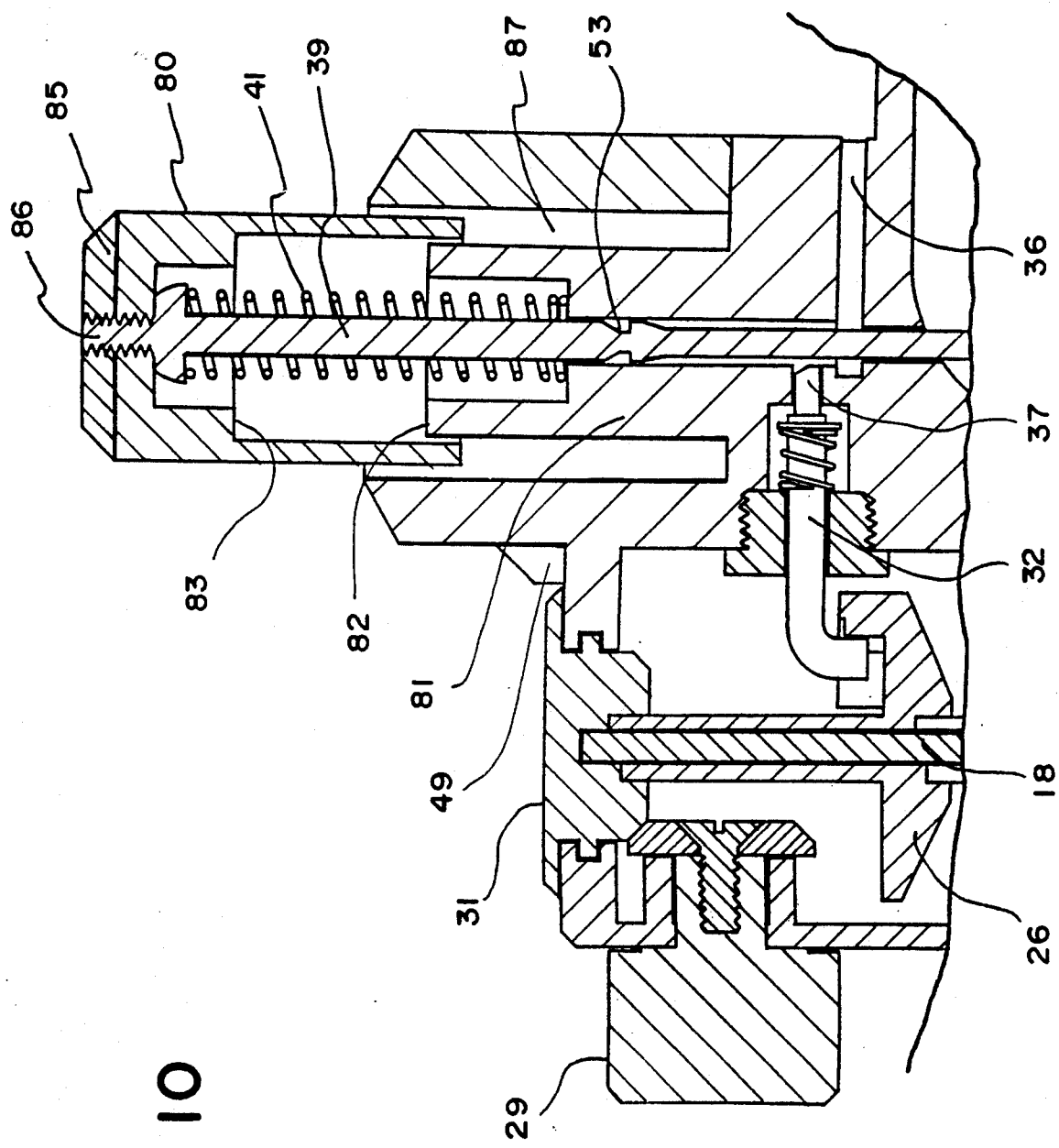
FIG. 10 is a cross-sectional view which illustrates an upper portion of an irrigation system in accordance with a second embodiment of the invention and with the system in a first or bypass position.
Figure 11:
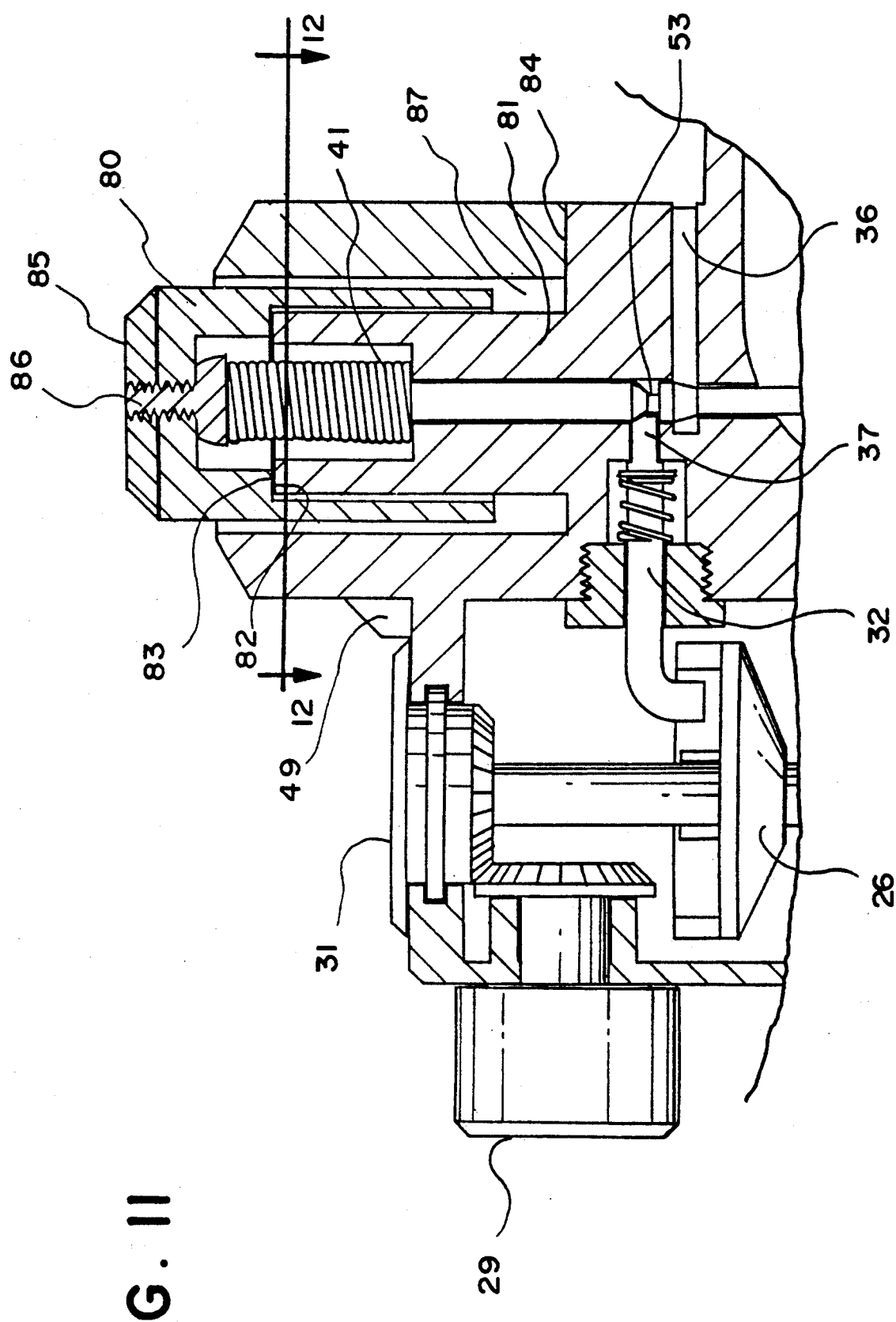
FIG. 11 is a cross-sectional view of the upper position of the system shown in FIG. 10, but with the system in an operative position for irrigating an adjacent area.
Figure 12:
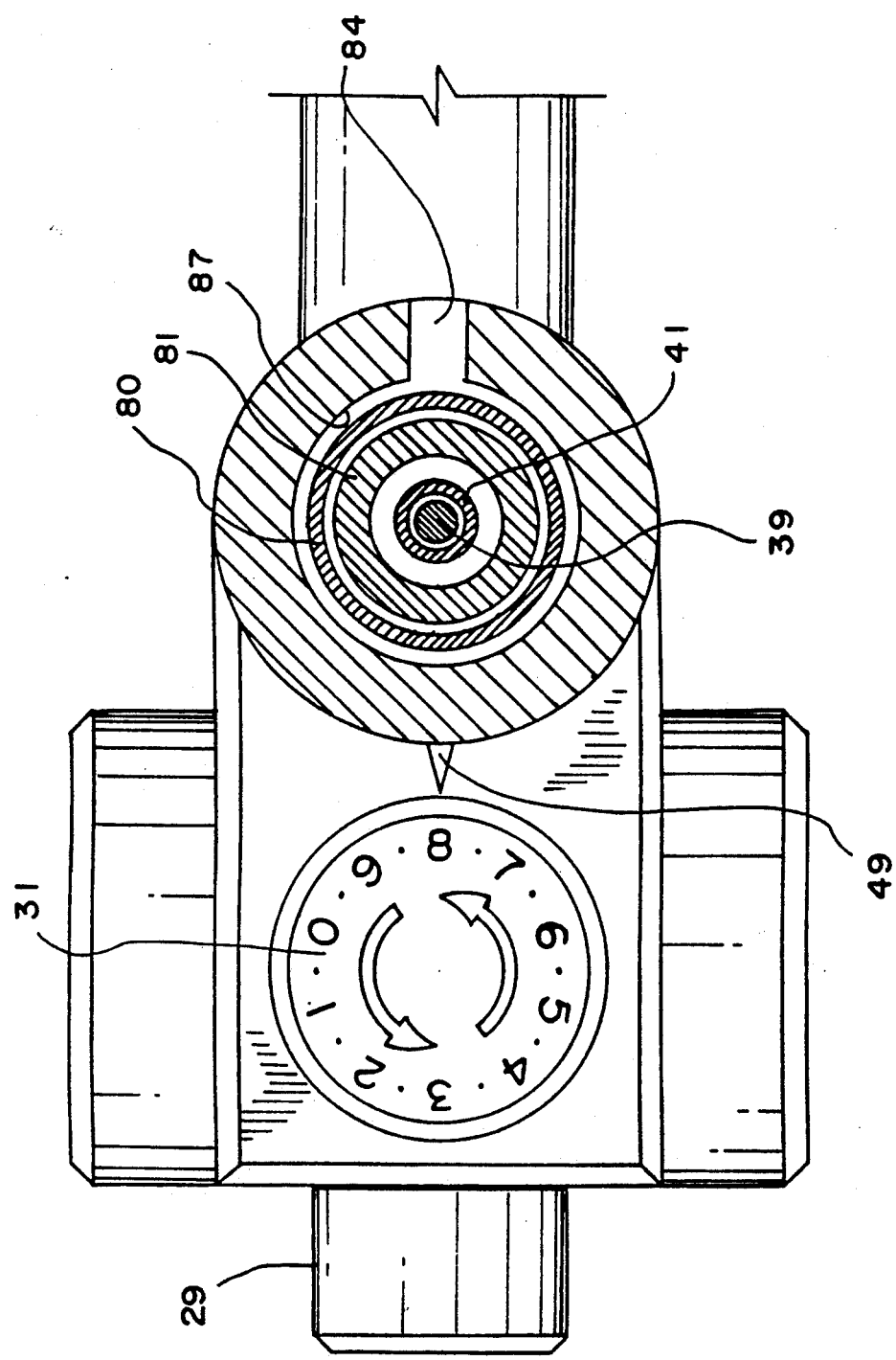
FIG. 12 is a sectional view taken along lines R—R in FIGS. 10 and 11.

A second embodiment of the invention is illustrated in FIGS. 10 through 12. As illustrated, the second embodiment of the invention provides visual means for indicating the status of each valve assembly. For example, an individual or farmer can tell from a distance whether or not an individual valve assembly or system is in a position to irrigate an adjacent area or whether water will bypass that area and flow through the system to a subsequent assembly.

As shown in FIGS. 10 and 12, a cover member 80, which corresponds to cap member 47 in the earlier embodiment, is in an elevated or raised position when rod 39 and gate member 7 (not shown in FIG. 10) is in an upper position, i.e., one in which the flow of water bypasses or flows through the lower passage in gate member 7. The cover member 80 is fixed to rod 39 by a threaded extension 86 and cap 85.

The cover member 80 is telescopically received in recess 87 within an upper housing 81. As shown in FIGS. 11 and 12, the upper cover is retained in a lower position by rod 39 and stop member 32 which positions gate member 7 (not shown in FIG. 11) in its lower or operative position, i.e., when water will be directed upwardly to irrigate an adjacent area. The cover 86 also includes an internal shoulder 83 for engagement with an abutment 82 on upper housing 81. The shoulder 83 and abutment 82 prevent the rod 39 from being pushed downwardly to a degree that the gate member 7 would strike the bottom of housing 1.

Figure 13A:
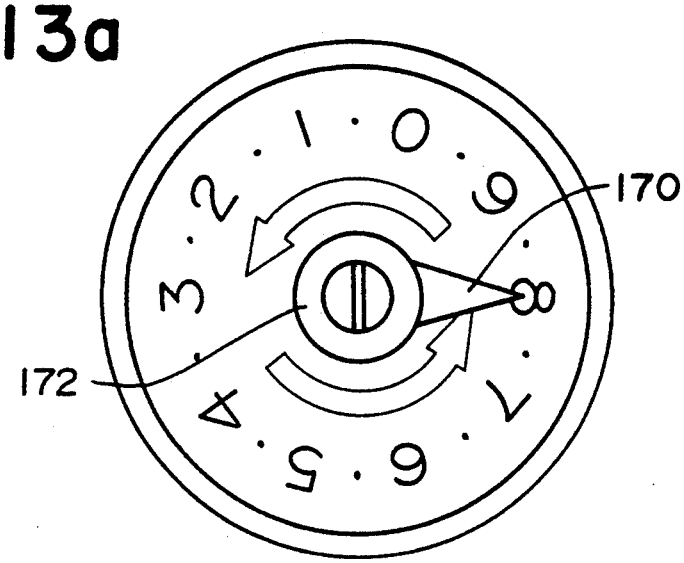
FIGS. 13a and 13b illustrate an indicator in accordance with one embodiment of the invention.
Figure 13B:
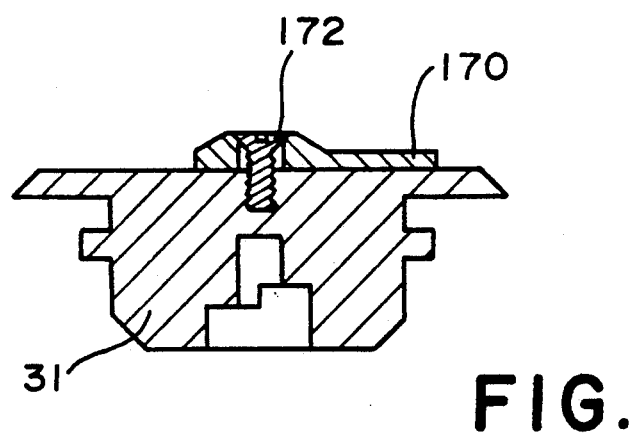

As illustrated in FIGS. 13a and 13b, a second indicator 170 is fixed to the upper surface of indicator 31 by means of a screw 172. This second indicator is provided for those cases where the amount of water to be provided to one basin or area is different than the amount to be forwarded to another area. In such cases, the second indicator is provided as an indication of the amount of water to be provided for each area. Once set, the second indicator is fixed in place by tightening screw 172. Once set, a relatively unskilled hand can set the dial to deliver the required amount of water to a given area.

While the invention has been described in connection with one of its preferred embodiments, it should be understood that changes and modifications may be made without departing from the scope of the appended claims.

What is claimed is:

1. An irrigation system for use with a pressurized source of water comprising a hollow valve housing which defines an upwardly extending hollow cylinder with top and bottom portions, said top portion defining a first annular outlet, said housing also defining an annular inlet in a lower portion thereof which is above said bottom portion by a distance which is approximately equal to the diameter of said annular inlet for connecting said housing to the pressurized source of water, said housing further defining a second annular outlet in said lower portion thereof with said second annular outlet being axially aligned with said annular inlet, an upwardly extending gate member slidably disposed within said hollow cylinder of said housing and adapted to move upwardly and downwardly within said hollow cylinder, said upwardly extending gate member defining a first passageway in an upper portion thereof for connecting said first annular outlet and said inlet when said gate member is in a first position so that water can flow through said housing and out of said first annular outlet, said upwardly extending gate member further defining a second passageway in a lower portion thereof for connecting said annular inlet and said second annular outlet when said gate member is in a second position so that water can flow through said housing, an upwardly extending pipe connected to said first annular outlet and means for directing a flow of water outwardly from said upwardly extending pipe, flow responsive means operatively associated with said gate member for moving said gate member from its first to its second position in response to a predetermined volume of water passing through said flow responsive means so that the flow of water passing through said inlet will flow through said second passageway and out of said second outlet and in which said flow responsive means includes a cylindrical element having a pair of slightly resilient arms which define an S-shaped stop means for rotating said cylindrical element in a first direction and for preventing rotation in an opposite direction.

2. An irrigation system for use with a pressurized source of water in accordance with claim 1 in which said upwardly extending gate member sealingly engages the hollow cylinder in said housing and in which the diameter of said passageway and said inlet and said outlets are approximately equal.

3. An irrigation system for use with a pressurized source of water in accordance with claim 2 in which said hollow cylinder in said housing defines a right circular cylinder.

4. An irrigation system in accordance with claim 1 which includes means exterior of said upwardly extending hollow housing for visually indicating the position of said gate member.

5. An irrigation system in accordance with claim 4 in which said means for visually indicating the position of said gate member positions said gate member in said first position.

6. An irrigation system in accordance with claim 1 in which said flow control means includes a disc-like cylindrical element having an upwardly extending wall along about one-half of its perimeter and a cam surface projecting inwardly toward the center of said disc-like element.

7. An irrigation system in accordance with claim 6 in which said flow control means also includes a spring biased L-shaped rod for engagement by said cam surface.

8. An irrigation system in accordance with claim 1 in which said gate member includes at least one vertical recess so that water can flow upwardly through said recess when said gate member is moved downwardly in said housing.

* * * * *